2

3,401,213
GRAFT COPOLYMERS OF DIENE RUBBER SUBSTRATE AND HYDROXYLIC POLYMER SUPERSTRATE
Quirino A. Trementozzi, Springfield, and Alfred A. Tedeschi, Longmeadow, Mass., assignors to Monsanto Company, a corporation of Delaware
No Drawing. Filed Oct. 17, 1963, Ser. No. 317,053
3 Claims. (Cl. 260—880)

ABSTRACT OF THE DISCLOSURE

Graft copolymers are prepared comprising a diene rubber substrate and a hydroxylic polymer superstrate. For example, monomeric mixtures containing 5–25 wt. percent vinyl benzyl alcohol or phenyl allyl alcohol, 0 to 60 wt. percent acrylonitrile and 40–90% of an ethylenically unsaturated compound such as styrene are polymerized with a diene rubbery polymer to yield the desired products. The graft copolymers exhibit improved adhesion to substrates and may be employed in laminating adhesives.

---

This invention relates to graft copolymers and more particularly to graft copolymers comprising a diene rubber substrate polymer and a hydroxylic superstrate polymer.

Graft copolymers comprising, for example, styrene-acrylonitrile copolymer superstrates on, for example, diene rubber or diene-styrene rubber substrates are known and find widespread use where toughness and strength, both tensile and impact, are important. Such graft copolymers have never, however, enjoyed success in applications, such as for instance laminated structures, where adhesion of the graft copolymer to a substrate such as, e.g., wood, glass, metal, etc., is desired.

It is, accordingly, an object of this invention to provide a novel class of graft copolymers.

Another object is the provision of a novel class of graft copolymers containing hydroxyl groups in the graft, or superstrate, polymer; the presence of hydroxyl groups in the backbone, or substrate, polymer being optional.

Another object is the provision of a novel class of graft copolymers exhibiting marked adhesion to substrates; e.g., wood, glass, metal, etc.

A further object is the provision of blends of the herein characterized novel graft copolymers with other polymeric compositions.

These and other objects are attained through the provision of graft copolymers comprising as substrate polymer a diene rubber polymer of:

(a) from about 40 to 100% by weight of a conjugated diene and, correspondingly, (b) from zero to about 60% by weight of copolymerizable ethylenically unsaturated monomer(s), at least a portion of which may be, optionally, an ethylenically unsaturated alcohol, and as superstrate polymer a polymer of:

(a) from about 1 to 100% by weight of an ethylenically unsaturated alcohol, (b) from zero to about 60% by weight of an ethylenically unsaturated nitrile, and (c) from zero to about 95% by weight of copolymerizable ethylenically unsaturated monomer(s).

The following examples are given to illustrate the invention. Unless otherwise specified, quantities are mentioned on a weight basis.

Example I.—Preparation of rubber latices; Series 1

Part A.—Prepare Rubber Latex A from the following polymerization recipe—

| Component: | Parts |
|---|---|
| Water | 200 |
| Butadiene | 100 |
| Sodium stearate | 5 |
| t-Dodecyl mercaptan | 0.4 |
| Potassium persulfate | 0.3 |

Charge the water and soap to a suitable reaction vessel, deoxygenate the soap solution by boiling, cool under nitrogen, add the remaining components of the recipe, and heat with agitation at 58° C. to 91% conversion of butadiene to polymer. The polybutadiene has a gel content of 72% and a swelling index of 32.

Part B.—Prepare Rubber Latex B by repeating Part A except for adding 0.5 part of divinylbenzene to the polymerization recipe. The polybutadiene has a gel content of 94% and a swelling index of 16.

Example II.—Preparation of graft copolymer latices; Series 1

Prepare a series of graft copolymer latices by (1) adding 0.15 part of potassium persulfate and 50 parts of water to aliquots of each of the Example I latices containing 100 parts of rubber solids, (2) heating the reaction mixture to 60° C. with agitation, (3) adding 60 parts of an 80:10:10 mixture of styrene, acrylonitrile, and vinyl benzyl alcohol to the reaction mixture over a period of 1.5 hours, and (4) maintaining the reaction mixture at 60° C. under agitation until substantially all of the monomer mixture has polymerized. Stabilize each of the latices by adding 3 parts of rubber stabilizer (2:1 mixture of ditertiarybutyl-p-cresol and tris(nonyl-phenyl)-phosphite) thereto. The products are designated Graft Copolymer Latices A and B to correspond to the designations of the rubber latices employed in their preparation. They are comprised of a butadiene substrate with a styrene/acrylonitrile/vinyl benzyl alcohol terpolymer superstrate grafted thereto.

Example III.—Preparation of graft copolymer; Series 2

Part A.—Prepare Rubber Latex C from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to polymer. The butadiene/styrene copolymer has a swelling index of about 16.

Part B.—Prepare a series of graft copolymer latices by adding varying amounts of an 80:10:10 mixture of styrene, acrylonitrile and vinyl benzyl alcohol, together with 0.2 parts of t-dodecyl mercaptan, to aliquots of Rubber Latex C containing 100 parts of rubber solids and heating the reaction mixture at 70° C. with agitation until substantially all of the monomer mixture has polymerized (circa 3 hours). Stabilize each of the latices by adding 2 parts of a styrenated phenol antioxidant thereto. The amount of monomer mixture added to Rubber Latex C in preparing each of the graft copolymer latices is shown below. The graft copolymers are comprised of a butadiene/styrene copolymer substrate with a styrene/acrylonitrile/vinyl benzyl alcohol terpolymer superstrate grafted thereto in the designated proportions.

| Graft copolymer latex: | Parts monomer mixture added/100 parts of rubber solids |
|---|---|
| C-1 | 15 |
| C-2 | 20 |
| C-3 | 30 |
| C-4 | 40 |
| C-5 | 50 |
| C-6 | 60 |
| C-7 | 70 |
| C-8 | 80 |
| C-9 | 90 |
| C-10 | 125 |
| C-11 | 150 |
| C-12 | 200 |

The following examples demonstrate other polyblend compositions within the scope of the invention.

Example IV.—Preparation of graft copolymer; Series 3

Part A.—Prepare Rubber Latex D from the following polymerization recipe—

| Component: | Parts |
|---|---|
| Water | 200 |
| Butadiene | 90 |
| Styrene | 10 |
| Divinylbenzene | 0.5 |
| Sodium stearate | 5 |
| t-Dodecyl mercaptan | 0.4 |
| Potassium persulfate | 0.3 |

Charge the water and soap to a suitable reaction vessel, deoxygenate the soap solution by boiling, cool under nitrogen, add the remaining components of the recipe, and heat with agitation at 50° C. to about 95% conversion of monomers to polymer. The butadiene/styrene copolymer has a swelling index of 16.

Part B.—Prepare a series of graft copolymer latices by adding varying amounts of an 80:10:10 by weight mixture of styrene, acrylonitrile and 2-phenyl allyl alcohol, together with 0.2 part of t-dodecyl mercaptan, to aliquots of Rubber Latex D containing 100 parts of rubber solids and heating the reaction mixture at 50° C. with agitation until substantially all of the monomer mixture has polymerized. Stabilize each of the latices by adding 2 parts of a styrenated phenol antioxidant thereto. The amount of monomer mixture added to Rubber Latex D in preparing each of the graft copolymer latices is shown below. The graft copolymers are comprised of a butadiene/styrene copolymer substrate with a styrene/acrylonitrile/2-phenyl allyl alcohol copolymer superstrate grafted thereto in the designated portions.

| Graft copolymer latex: | Parts monomer mixture added/100 parts of rubber solids |
|---|---|
| D-1 | 15 |
| D-2 | 20 |
| D-3 | 30 |
| D-4 | 40 |
| D-5 | 50 |
| D-6 | 60 |
| D-7 | 70 |
| D-8 | 80 |
| D-9 | 90 |
| D-10 | 125 |
| D-11 | 150 |
| D-12 | 200 |

Example V.—Preparation of graft copolymer; Series 4

Part A.—Prepare Rubber Latex E from the following polymerization recipe—

| Component: | Parts |
|---|---|
| Water | 250 |
| Butadiene | 75 |
| Styrene | 10 |
| Vinyl benzyl alcohol | 15 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene/vinyl benzyl alcohol copolymer.

Part B.—Prepare a series of graft copolymer latices by adding varying amounts of an 80:10:10 by weight mixture of styrene, acrylonitrile, and vinyl benzyl alcohol, together with 0.2 part of t-dodecyl mercaptan, to aliquots of Rubber Latex E containing 100 parts of rubber solids and heating the reaction mixture at 50° C. with agitation until substantially all of the monomer mixture has polymerized. Stabilize each of the latices by adding 2 parts of a styrenated phenol antioxidant thereto. The amount of monomer mixture added to Rubber Latex E in preparing each of the graft copolymer latices is shown below. The graft copolymers are comprised of a butadiene/styrene/vinyl benzyl alcohol copolymer substrate with a styrene/acrylonitrile/vinyl benzyl alcohol copolymer superstrate grafted thereto in the designated proportions.

| Graft copolymer latex: | Parts monomer mixture added/100 parts of rubber solids |
|---|---|
| E-1 | 15 |
| E-2 | 20 |
| E-3 | 30 |
| E-4 | 40 |
| E-5 | 50 |
| E-6 | 60 |
| E-7 | 70 |
| E-8 | 80 |
| E-9 | 90 |
| E-10 | 125 |
| E-11 | 150 |
| E-12 | 200 |

Example VI.—Preparation of graft copolymer; Series 5

Part A.—Prepare Rubber Latex F from the following polymerization recipe—

| Components: | Parts |
|---|---|
| Water | 250 |
| Butadiene | 75 |
| Styrene | 10 |
| 2-Phenyl allyl alcohol | 15 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene/2-phenyl allyl alcohol copolymer.

Part B.—Prepare a series of graft copolymer latices by adding varying amounts of an 80:10:10 by weight mixture of styrene, acrylonitrile and 2-phenyl allyl alcohol, together with 0.2 part of t-dodecyl mercaptan, to aliquots of Rubber Latex F containing 100 parts of rubber solids and heating the reaction mixture at 50° C. with agitation until substantially all of the monomer mixture has polymerized. Stabilize each of the latices by adding 2 parts of a styrenated phenol antioxidant thereto. The amount of monomer mixture added to Rubber Latex F in preparing each of the graft copolymer latices is shown below. The graft copolymers are comprised of a butadiene/styrene/2-phenyl allyl alcohol copolymer substrate with a styrene/acrylonitrile/2-phenyl allyl alcohol copolymer superstrate grafted thereto in the designated proportions.

| Graft copolymer latex: | Parts monomer mixture added/100 parts of rubber solids |
|---|---|
| F-1 | 15 |
| F-2 | 20 |
| F-3 | 30 |
| F-4 | 40 |
| F-5 | 50 |
| F-6 | 60 |
| F-7 | 70 |
| F-8 | 80 |
| F-9 | 90 |
| F-10 | 125 |
| F-11 | 150 |
| F-12 | 200 |

Example VII.—Preparation of graft copolymers; Series 6

Part A.—Prepare Rubber Latex G from the following polymerization recipe—

| Component: | Parts |
|---|---|
| Water | 250 |
| Butadiene | 80 |
| Vinyl benzyl alcohol | 20 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/vinyl benzyl alcohol copolymer.

Part B.—Prepare graft copolymer latices by adding 40 parts of an 80:10:10 by weight mixture of styrene, acrylonitrile and vinyl benzyl alcohol, together with 0.2 part of t-dodecyl mercaptan, to a portion of Rubber Latex G containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/vinyl benzyl alcohol copolymer substrate with a styrene/acrylonitrile/vinyl benzyl alcohol copolymer superstrate grafted thereto.

Example VIII.—Preparation of graft copolymer; Series 7

Part A.—Prepare Rubber Latex H from the following polymerization recipe—

| Component: | Parts |
|---|---|
| Water | 250 |
| Butadiene | 80 |
| 2-phenyl allyl alcohol | 20 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/2-phenyl allyl alcohol copolymer.

Part B.—Prepare a graft copolymer latex by adding 50 parts of an 80:10:10 by weight mixture of styrene, acrylonitrile and 2-phenyl allyl alcohol, together with 0.2 part of t-dodecyl mercaptan, to a portion of Rubber Latex H containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/2-phenyl allyl alcohol copolymer substrate with a styrene/acrylonitrile/2-phenyl allyl alcohol copolymer superstrate grafted thereto.

Example IX.—Preparation of graft copolymer; Series 8

Part A.—Prepare Rubber Latex I from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare graft copolymer latex by adding 60 parts of an 80:20 by weight mixture of styrene and vinyl benzyl alcohol, together with 0.2 part of t-dodecyl mercaptan, to a portion of Rubber Latex I containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a styrene/vinyl benzyl alcohol copolymer superstrate grafted thereto.

Example X.—Preparation of graft copolymer; Series 9

Part A.—Prepare Rubber Latex J from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 70 parts of an 80:20 by weight mixture of styrene and 2-phenyl allyl alcohol, together with 0.2 part of t-dodecyl mercaptan, to a portion of Rubber Latex J containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a styrene/2-phenyl allyl alcohol copolymer superstrate grafted thereto.

Example XI.—Preparation of graft copolymer; Series 10

Part A.—Prepare Rubber Latex K from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 25 parts of vinyl benzyl alcohol, together with 0.2 part of t-dodecyl mercaptan, to a portion of Rubber Latex K containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a vinyl benzyl alcohol polymer superstrate grafted thereto.

Example XII.—Preparation of graft copolymer; Series 11

Part A.—Prepare Rubber Latex L from the following polymerization recipe—

| Component: | Parts |
|---|---|
| Water | 250 |
| Butadiene | 100 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to polybutadiene.

Part B.—Prepare a graft copolymer latex by adding 35 parts of 2-phenyl allyl alcohol, together with 0.2 part of t-dodecyl mercaptan, to a portion of Rubber Latex L containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a polybutadiene substrate with a 2-phenyl allyl alcohol polymer grafted thereto.

Example XIII.—Preparation of graft copolymer; Series 12

Part A.—Prepare Rubber Latex M from the following polymerization recipe—

| Component: | Parts |
|---|---|
| Water | 250 |
| Isoprene | 75 |
| Styrene | 25 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to isoprene/styrene copolymer.

Part B.—Prepare a graft copolymer latex by adding 90 parts of 2-hydroxymethyl butadiene-1,3, together with 0.2 part of t-dodecyl mercaptan, to a portion of Rubber Latex M containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of an isoprene/styrene copolymer substrate with a 2-hydroxymethyl butadiene-1,3 polymer grafted thereto.

Example XIV.—Preparation of graft copolymer; Series 13

Part A.—Prepare Rubber Latex N from the following polymerization recipe—

| Component: | Parts |
|---|---|
| Water | 250 |
| Butadiene | 90 |
| Acrylonitrile | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe and heat with agitation at 50° C. to about 95% conversion of monomers to butadiene/acrylonitrile copolymer.

Part B.—Prepare a graft copolymer latex by adding 40 parts of an 80:10:10 by weight mixture of styrene, acrylonitrile and vinyl benzyl alcohol, together with 0.2 part of t-dodecyl mercaptan, to a portion of Rubber Latex N containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/acrylonitrile copolymer substrate with a styrene/acrylonitrile/vinyl benzyl alcohol copolymer superstrate grafted thereto.

Example XV.—Preparation of graft copolymer; Series 14

Part A.—Prepare Rubber Latex O from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the receipe, and heat with agitation at 50° C. to about 95% conversion of monomers to butadiene/styrene copolymer.

Part B.—Prepare a graft copolymer latex by adding 50 parts of an 80:20 by weight mixture of vinyl chloride and ethyl-betahydroxyethyl-fumarate, together with 0.2 part of t-dodecyl mercaptan, to a portion of Rubber Latex O containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a vinyl chloride/ethylbetahydroxyethyl - fumarate copolymer superstrate grafted thereto.

Example XVI.—Preparation of graft copolymer; Series 15

Part A.—Prepare Rubber Latex P from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 30 parts of a 75:25 by weight mixture of methyl methylacrylate and bis-(betahydroxyethyl) fumarate, together with 0.2 part of t-dodecyl mercaptan, to a portion of Rubber Latex P containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a methyl methacrylate/bis-(betahydroxyethyl)fumarate copolymer superstrate grafted thereto.

Example XVII.—Preparation of graft copolymer;
Series 16

Part A.—Prepare Rubber Latex Q from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 60 parts of a 90:10 by weight mixture of ethyl acrylate and betahydroxyethyl acrylate, together with 0.2 part of t-dodecyl mercaptan, to a portion of Rubber Latex Q containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a ethyl acryalte/betahydroxyethyl acrylate copolymer superstrate grafted thereto.

Example XVIII.—Preparation of graft copolymer;
Series 17

Part A.—Prepare Rubber Latex R from the following polymerization recipe—

| Component: | Parts |
|---|---|
| Water | 250 |
| Butadiene | 90 |
| Styrene | 10 |
| Divinylbenzene | .05 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 30 parts of a 23:77 by weight mixture of butene-1 and ethyl-betahydroxyethyl-fumarate, together with 0.2 part of t-dodecyl mercaptan, to a portion of Rubber Latex R containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a butene-1/ethyl-betahydroxyethyl-fumarate copolymer superstrate grafted thereto.

Example XIX.—Preparation of graft copolymer;
Series 18

Part A.—Prepare Rubber Latex S from the following polymerization recipe—

| Component: | Parts |
|---|---|
| Water | 250 |
| Butadiene | 90 |
| Styrene | 10 |
| Divinylbenzene | 0.5 |
| Sodium stearate | 5 |
| Potassium peruslfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene copolymer.

Part B.—Prepare a graft copolymer latex by adding 40 parts of a 75:25 by weight mixture of butadiene and 2-phenyl allyl alcohol, together with 0.2 part of t-dodecyl mercaptan, to a portion of Rubber Latex S containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene copolymer substrate with a butadiene/2-phenyl allyl alcohol copolymer superstrate grafted thereto.

Example XX.—Preparation of graft copolymer;
Series 19

Part A.—Prepare Rubber Latex T from the following polymerization recipe—

| Component: | Parts |
|---|---|
| Water | 250 |
| Butadiene | 80 |
| Styrene | 10 |
| Vinyl benzyl alcohol | 10 |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to butadiene/styrene/vinyl benzyl alcohol copolymer.

Part B.—Prepare a graft copolymer latex by adding 50 parts of a 75:25 by weight mixture of butadiene and vinyl benzyl alcohol, together with 0.2 part of t-dodecyl mercaptan, to a portion of Rubber Latex T containing 100 parts of rubber solids and heating the reaction mixture at 50° C. with agitation until substantially all of the monomer mixture has polymerized. Stabilize the latex by adding 2 parts of a styrenated phenol antioxidant thereto. The graft copolymer is comprised of a butadiene/styrene/vinyl benzyl alcohol copolymer substrate with a butadiene/vinyl benzyl alcohol copolymer superstrate copolymer grafted thereto.

The graft copolymers of this invention are prepared by polymerizing from about 15 to 200 parts by weight of superstrate monomer in an aqueous dispersion containing 100 parts by weight of the diene rubber polymer which will form the substrate of the graft copolymer. The aforesaid superstrate monomer comprises an ethylenically unsaturated alcohol in optional admixture with one or more copolymerizable ethylenically unsaturated monomers, one of which may be a nitrile monomer, in proportions of from about 1 to 100% by weight of the ethylenically unsaturated alcohol, from zero to about 60% by weight of the ethylenically unsaturated nitrile, and from zero to about 95% by weight of other copolymerizable ethylenically unsaturated monomers. The preferred graft copolymers are those prepared by polymerizing from about 20 to 90 parts, and particularly 40 to 80 parts, of superstrate monomer(s) per 100 parts of diene rubber polymer.

The graft copolymerization reaction is conducted with agitation at a temperature at which the initiator in the system initiates copolymerization of the superstrate monomer(s), usually a temperature of 40–100° C. Supplementary polymerization initiator may be added to the system to insure substantially complete conversion of the monomer charge to polymer, but this supplementary initiator is frequently unnecessary because of the ability of unconsumed initiator remaining from the preparation of the diene rubber polymer and/or active sites on the chain of the diene rubber polymer to initiate polymerization of the monomer charge.

The reaction is preferably conducted in the substantial absence of any emulsifying agent added to the preformed diene rubber polymer latex because of the effect of added emulsifying agent in decreasing grafting efficiency. The emulsifying agent already present in the diene rubber polymer latex is usually sufficient to act as a dispersing agent for the graft copolymerization reaction. If desired, however, up to about 2% of emulsifying agent, based on the weight of the superstrate monomer mixture, can be added to the aqueous dispersion. The observance of this precaution with regard to added emulsifying agent permits the attainment of high grafting efficiency. As a result, the graft copolymers of the invention generally have at least 80% of the superstrate chemically-combined with the substrate. Since no unreacted rubber can be extracted from the graft copolymer, it appears that all of the diene rubber polymer becomes chemically-combined with the superstrate.

Optional additives, such as chain transfer agents and stabilizers, can be included in the graft copolymerization reaction mixture when desired.

Graft copolymer superstrate

The superstrate of the graft copolymer comprises (a) from about 1 to 100%, and preferably from about 5 to 25%, by weight of a chemically-combined ethylenically unsaturated alcohol, (b) from zero to about 60%, preferably from zero to about 30%, by weight of a chemically-combined ethylenically unsaturated nitrile and (c) from zero to about 95%, and preferably from about 40 to 90%, by weight of other chemically-combined copolymerizable ethylenically unsaturated monomer(s).

The ethylenically unsaturated alcohols suitable for use in this invention are ethylenically unsaturated mono- and poly- hydroxylic monomers. If desired, other functional groups than hydroxyl may be present in the monomer structure. Thus, these alcohols may be selected from a wide class of materials including aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4 - hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3-bis-(hydroxymethyl)butadiene - 1,3, etc.; hydroxylic mono- and poly- carboxylic acid esters such as, e.g., ethyl betahydroxyethyl fumarate, bis-(betahydroxyethyl)fumarate, betahydroxyethyl acrylate, butyl betahydroxypropyl fumarate, betahydroxypropyl methacrylate, betahydroxypropyl crotonate, bis - (betahydroxyethyl)itaconate, ethyl betahydroxyethyl maleate, alphahydroxymethyl methacrylate, etc.; hydroxylic mono- and poly-carboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2-hydroxymethyl allyl amine, etc.; alphahydroxymethyl acrylonitrile; etc. Various of these alcohols are employed in the examples, but may be replaced, with equivalent results, with any of the other alcohols characterized above, or mixtures thereof.

Ethylenically unsaturated nitriles suitable for use in this invention are acrylonitrile, methacrylonitrile, and mixtures thereof.

The copolymerizable ethyenically unsaturated monomer(s) suitable for use in this invention are selected from a wide class of vinyl and vinylidene monomers including olefins such as, e.g., ethylene, propylene, isobutylene, 3-methyl butene-1, butene-1, pentene-1, etc., mono- and poly- carboxylic acid esters such as, e.g., methyl methacrylate, ethyl acrylate, diethyl maleate, etc.; mono- and poly- carboxylic acids or anhydrides such as, e.g., acrylic acid, methacrylic acid, crotonic acid, fumaric acid, maleic acid, maleic anhydride, itaconic acid, etc.; vinyl and vinylidene halides such as, e.g., vinyl chloride, vinyl bromide, vinylidene chloride, etc. Particularly preferred are the monovinylidene aromatic compounds such as styrene; and substituted alkyl styrenes such as, e.g., ortho-, meta- and para- methylstyrenes, 2,4-dimethylstyrene, para-ethyl styrene, etc.; aryl substituted halostyrenes such as e.g., ortho- meta- and para- chlorostyrenes or bromostyrenes, 2,4-dichlorostyrene, 2-methyl-4-chlorostyrene, etc.; mixtures thereof with one another; and mixtures thereof with alphamethylstyrene. When alphamethylstyrene-containing mixtures are employed, the components should be proportioned such that the alphamethylstyrene does not constitute more than about 70% of the total weight of the superstrate-forming monomers. Various of the ethylenically unsaturated monomers hereinabove defined are employed in the examples, but may be replaced, with equivalent results, with any of the other monomers characterized above, or mixtures thereof.

Graft copolymer substrate

The substrate of the graft copolymer is a diene rubber polymer which comprises, (a) from about 40 to 100%, and preferably from about 75 to 100%, by weight of a chemically-combined conjugated diene and (b) from zero to about 60%, and preferably zero to about 25%, by weight of other chemically-combined ethylenically unsaturated monomer(s).

Conjugated dienes suitable for use in this invention are butadiene, isoprene, and mixtures thereof.

The copolymerizable ethylenically unsaturated monomer(s) suitable for use in this invention are selected from a wide class of vinyl and vinylidene monomers as defined above in conjunction with the superstrate monomers. In a preferred embodiment, the substrate will comprise the conjugated diene in chemical combination with, as the copolymerizable monomer, an ethylenically unsaturated alcohol or a monovinylidene aromatic compound, both as heretofore defined. In a particularly preferred embodiment, both an ethylenically unsaturated alcohol and a monovinylidene aromatic compound, and especially styrene, will be employed. In this last embodiment, the diene rubber polymer substrate will comprise (a) from about 40 to 99%, and preferably from about 75 to 99%, by weight of the chemically-combined conjugated diene, (b) from about 1 to 60%, and preferably from about 1 to 25%, by weight of the chemically-combined hydroxylic monomer and (c) from about 1 to 60% and preferably from about 1 to 25%, by weight of the monovinylidene aromatic compound.

This invention is not limited in the manner of manufacture of the diene rubber polymer. The examples show free radical polymerization in aqueous systems but equally satisfactory results are obtained using, e.g., anionic or cationic catalysis in aqueous or organic systems. In this way, diene rubbers may be made from monomer combinations which do not readily polymerize by, e.g., free radical mechanism. Similarly, monomers which do not copolymerize readily with butadiene or isoprene can be used in conjunction with other copolymerizable monomers capable of copolymerization with both to form, e.g., terpolymers.

Thus, in various embodiments the copolymerizable ethylenically unsaturated monomer(s) may be olefins such as, e.g., ethylene, propylene, isobutylene, 3-methyl butene-1, butene-1, penetene-1, etc., mono- and poly-carboxylic acid esters such as, e.g., methyl methacrylate, ethyl acrylate, diethyl maleate, etc.; mono- and poly- carboxylic acids or anhydrides such as, e.g., acrylic acid, methacrylic acid, crotonic acid, fumaric acid, maleic acid, maleic anhydride, itaconic acid, etc.; vinyl and vinylidene halides such as e.g., vinyl chloride, vinyl bromide, vinylidene chloride, etc.; monovinylidene aromatic compounds such as styrene; aryl substituted alkyl styrenes such as, e.g., ortho- meta- and para- methylstyrenes, 2,4-dimethyl-styrene, para-ethyl styrene, etc.; aryl substituted halostyrenes such as, e.g., ortho-, meta- and para-chlorostyrenes or bromo-styrenes, 2,4-dichlorostyrene, 2-methyl-4-chlorostyrene, etc.; aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene-1,3, 2,3-bis-(hydroxymethyl) butadiene-1,3, etc.; hydroxylic mono- and poly- carboxylic acid esters such as e.g., ethyl betahydroxy-ethyl fumarate, bis-(betahydroxy-ethyl)fumarate, beta-hydroxyethyl acrylate, butyl betahydroxy-propyl fumarate, betahydroxypropyl methacrylate, beta-hydroxypropyl crotonate, bis-(betahydroxyethyl) itaconate, ethyl betahydroxyethyl maleate, alphahydroxymethyl methacrylate, etc.; hydroxylic mono- and poly- carboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylmide, 2-hydroxymethyl allyl amine, etc.; alphahydroxymethyl acrylonitrile; etc. Various of the ethylenically unsaturated monomers hereinabove defined are employed in the examples, but may be replaced, with equivalent results, with any of the other monomers characterized above, or mixtures thereof.

If desired, a chemical cross-linking agent can be used in the preparation of the substrate polymer. Generally, amounts of up to about 5% based on the weight of the rubber-forming monomers is sufficient. Cross-linking agent contents of 0.5–1.25% are particularly advantageous. Any cross-linking agent capable of reacting with the rubber-forming monomers can be used in the practice of the invention. Such cross-linking agents are, of course, already well known and include, e.g., divinyl-benzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

In preparing the graft copolymers of the invention, the diene rubber polymers are usually employed in the form of freshly-prepared latices or latices which have been stored in an inert atmosphere. These latices can be prepared by any of the aqueous emulsion polymerization techniques conventionally utilized for the preparation of such latices. Generally, the monomers are emulsified in water with the aid of about 2–7%, based on the weight of the monomers, of a micelle-forming emulsifying agent and polymerized at 0–80° C. in the presence of a water-soluble free radical polymerization initiator or redox catalyst. The reaction mixture can, and usually does, also contain a chain transfer agent, e.g., a higher alkyl mercaptan such as dodecyl mercaptan.

Graft copolymers

The graft copolymers of this invention can be varied to considerable extent through control of their composition. They may be soft and flexible or yieldable semi-rigid or rigid elastomers depending upon the diene content. However, as opposed to other graft copolymers, the graft copolymers of this invention are particularly characterized by the adhesion which they show to substrates of all types; e.g., wood, metal, brick, plaster, glass, plastics, etc. Thus, the graft copolymers of this invention find many uses such as, for example, electrical insulation; caulking compounds; elastomers; surface coating resins, particularly in aqueous latex or solvent solution form, for example, e.g., wall-paints, etc.; coating for tire cords to adhesively stabilize the tire cords in the rubber matrix, adhesives for laminating various materials such as, e.g., wood, glass, fibers, etc. together; as molding compounds; elastomeric films for, e.g., pressure-sensitive adhesive tapes and electrical tapes, etc.

The graft copolymers of this invention, containing hydroxyl, as well as possibly other, functionality, can be crosslinked using conventional crosslinking compounds such as, e.g., diisocyanates, epoxy resins, aminoplasts, etc.

Graft rubber polyblends

The graft copolymers of this invention are particularly useful in polyblends with other resinous materials, where their hydroxylic structure imparts greater adhesion of the graft copolymer or the polyblend to all kinds of substrates. In polyblends with thermosetting resins, their hydroxyls may react with the cross-linking functionality of the second polymer, thus developing primary bonding between the two polymer phases. In any event, polyblends prepared using the hydroxylic graft copolymers of this invention are tough and possess excellent impact and tensile strength.

In the following example polyblends of (a) the grafted copolymers prepared in Examples III and IX, (b) with a copolymer of 80 weight percent styrene and 20 weight percent maleic anhydride are used in the fabrication of glass laminates.

Example XXI.—Preparation of graft copolymer dispersions

Part A.—Each of Rubber Latexes C–6 and I, prepared in Examples III and IX respectively, are treated as follows to convert them to about 15% solids dispersions in methyl-ethyl-ketone. A portion of Rubber Latex containing 100 parts of rubber solids (circa 350 parts) is poured, at room temperature, into about 1750 parts of methanol to precipitate the polymer solids. These solids are subsequently recovered by filtration and washed several times with about 250 part portions of methanol to remove substantially all water. The solids are then added, with stirring, to 570 parts of methyl-ethyl-ketone. The resulting dispersions are termed MEK dispersions C–6 and I.

Preparation of polyblend laminating syrup

Part B.—100 parts of a styrene/maleic anhydride comprising 80 weight percent styrene and 20 weight percent maleic anhydride and having a molecular weight of about 2200 as measured by intrinsic viscosity, 20 parts of an epoxide condensation product of 1 molar proportion of bis-phenol-A with 2 molar proportions of epichlorohydrin, and 1 part of dodecyl trimethyl ammonium chloride are added to 55 parts of each of MEK dispersions C–6 and I (ca. 8 parts of rubber solids in each) prepared in Part A above. Further methyl-ethyl-ketone is then added to bring the total solids to approximately 62%, based upon the combined weight of solids and methyl-ethyl-ketone. The resulting syrups are termed laminating syrups C–6 and I.

Preparation of laminate

Part C.—Duplicate sheets of woven glass cloths (HG28–A1100) are impregnated with polymer by soaking in each of laminating syrups C–6 and I, removing excess syrup by drawing the cloths over a scraper bar, and finally drying at about 125° C. for 5 minutes. The resulting impregnated cloth contains about 40% resin solids. Laminates are then prepared by first cutting each cloth into a plurality of 4 inch by 4 inch squares, laying up 7 plies of the cloth with the warp running in the same direction in all plies, and finally hot pressing each assembly at 150° C. and 1000 p.s.i. for 30 minutes to consolidate the laminates and cure the resin. Each laminate is then cut into a plurality of identical strips measuring ½ inch in width by 4 inches long. With a knife, the second and third plies (measured from one surface) of each strip are separated for a distance of 1½ inches along the 4 inch dimension, causing said strips to have, for 1½ inches of their length, a 5-ply section and a 2-ply section. Each strip is then horizontally clamped with the 5-ply section fixedly positioned upwards and the separated 2-ply section hanging downward. Weight is applied to the 2-ply section, steadily increasing the weight until the 2-ply section starts to peel away from the 5-ply section. The total weight applied multiplied by 2 equals the peel strength in grams per inch of that strip. The results are recorded below, as compared to a comparative laminate prepared in the same fashion using the styrene/maleic anhydride copolymer (SMA) laminating syrup of Part B, but omitting the MEK graft copolymer dispersion.

| Graft copolymer from example | Laminating syrup | Peel strength (grams/inch) |
| --- | --- | --- |
|  | SMA Control | 906 |
| III | C–6 | 3,400 |
| IX | I | 2,385 |

Polyblends containing the graft copolymers of this invention are, therefore, useful as laminating adhesives, molding compounds, etc. and may be in the form of, e.g., aqueous latexes, organic dispersions, sheets, shaped articles, etc. and may be fabricated by, e.g., vacuum forming, injection molding, extrusion, melt spinning, mill rolling, etc.

The polyblends may be prepared by blending latices of the graft copolymer and the interpolymer and recovering the polymers from the mixed latices by any suitable means, e.g., drum-drying, spray-drying, coagulating, etc. Preferably they are prepared by simply comalaxating a mixture of the interpolymer and the graft copolymer at an elevated temperature for a period of time sufficient to provide an intimate fusion blend of the polymers. The fact that blends of the graft copolymer and the interpolymer can be prepared by simply blending the two polymers together on conventional plastics working equipment, such as rubber mills, screw extruders, etc., is a matter of considerable importance.

It is obvious that many variations can be made in the products and processes set forth above without departing from the spirit and scope of this invention.

What is claimed is:

1. A composition of matter comprising 100 parts by weight of a diene rubber polymer containing:
    (a) 40–100% by weight of a conjugated diene selected from the group consisting of butadiene, isoprene and mixtures thereof, and, correspondingly
    (b) 0–60% by weight of a copolymerizable ethylenically unsaturated monomer, said diene rubber polymer having graft polymerized thereon 15–200 parts by weight of the following:
        (1) 5–25% by weight of a copolymerizable ethylenically unsaturated alcohol selected from the group consisting of vinyl benzyl alcohol, phenyl allyl alcohol and mixtures thereof,
        (2) 0 to about 60% by weight of an ethylenically unsaturated nitrile, and
        (3) 40–90% by weight of a copolymerizable ethylenically unsaturated monomer.

2. The composition of claim 1 wherein the diene rubber polymer also contains from about 1 to about 60% by weight of a copolymerizable ethylenically unsaturated alcohol selected from the group consisting of vinyl benzyl alcohol, phenyl allyl alcohol and mixtures thereof.

3. A composition of matter comprising 100 parts by weight of a diene rubber polymer containing:
    (a) 40–100% by weight butadiene and, correspondingly,
    (b) 0–60% by weight styrene, said diene rubber polymer having graft polymerized thereon 15–200 parts by weight of the following:
        (1) 5–25% by weight of an alcohol selected from the group consisting of vinyl benzyl alcohol and 2-phenyl allyl alcohol,
        (2) 0 to about 60% by weight of an ethylenically unsaturated nitrile selected from the group consisting of acrylonitrile, methacrylonitrile and mixtures thereof, and
        (3) 40–90% by weight styrene.

References Cited
UNITED STATES PATENTS

| | | | |
| --- | --- | --- | --- |
| 2,695,834 | 11/1954 | De Nie | 260—879 |
| 2,802,808 | 8/1957 | Hayes | 260—876 |
| 3,038,890 | 6/1962 | Abramo et al. | 260—82.1 |
| 3,085,074 | 4/1963 | Burke et al. | 260—876 |
| 3,119,785 | 1/1964 | Van Gils | 260—879 |
| 3,223,655 | 12/1965 | Murdock | 260—879 |
| 3,255,276 | 6/1966 | Winter et al. | 260—4 |

GEORGE F. LESMES, *Primary Examiner.*